US010007689B1

(12) United States Patent
Ray et al.

(10) Patent No.: US 10,007,689 B1
(45) Date of Patent: Jun. 26, 2018

(54) TEMPORALLY CONSISTENT GROUP KEYS

(71) Applicant: Walmart Apollo, LLC, Bentonville, AR (US)

(72) Inventors: Andrew Benjamin Ray, Bentonville, AR (US); Nathaniel Philip Troutman, Seattle, WA (US)

(73) Assignee: Walmart Apollo, LLC, Bentonville, AR (US)

( * ) Notice: Subject to any disclaimer, the term of this patent is extended or adjusted under 35 U.S.C. 154(b) by 535 days.

(21) Appl. No.: 14/214,204

(22) Filed: Mar. 14, 2014

(51) Int. Cl.
*G06F 17/30* (2006.01)
*G06F 17/00* (2006.01)

(52) U.S. Cl.
CPC .............................. *G06F 17/30336* (2013.01)

(58) Field of Classification Search
CPC .... G06Q 50/01; G06Q 10/00; G06Q 10/0635; G06Q 10/0637; G06Q 10/10; G06Q 30/02; G06Q 30/0277; G06Q 50/22; G06Q 10/06316; G06Q 10/0836; G06Q 10/101; G06Q 10/107; G06Q 20/30; G06Q 30/0203; G06Q 30/0204; G06Q 30/0267; G06Q 30/0279; G06Q 30/06
See application file for complete search history.

(56) References Cited

U.S. PATENT DOCUMENTS

| | | | |
|---|---|---|---|
| 8,301,610 B2 | 10/2012 | Driesen | |
| 8,312,028 B2 * | 11/2012 | Canora | G06F 17/30997 705/310 |
| 8,386,529 B2 | 2/2013 | Chaudhuri | |
| 8,522,206 B2 | 8/2013 | Chan | |
| 2006/0111135 A1 * | 5/2006 | Gray | H04W 4/08 455/519 |
| 2008/0120271 A1 * | 5/2008 | Hunt | G06Q 10/02 |
| 2015/0039600 A1 * | 2/2015 | Walters | G06F 17/30867 707/725 |

OTHER PUBLICATIONS

Application and Filing Receipt for U.S. Appl. No. 14/213,951, filed Mar. 14, 2014, Inventors: Ray et al.

* cited by examiner

*Primary Examiner* — Yicun Wu
(74) *Attorney, Agent, or Firm* — Amy M. Salmela; Patterson Thuente Pedersen, P.A.

(57) ABSTRACT

The present disclosure extends to temporally consistent group keys for groups of linked records in a data store. In embodiments, records in the data store can be categorized as persistent or temporary. Each record carries a unique record identifier and a timestamp depicting the record's time of creation. The group key for a group is the record identifier for the oldest persistent record in the group. If a group has no persistent records, the group key is the record identifier for the oldest temporary record in the group. If two or more records have identical timestamps, the group key is the first record identifier in a lexicographical ordering of the record identifiers for records having the earliest timestamps.

20 Claims, 4 Drawing Sheets

US 10,007,689 B1

TEMPORALLY CONSISTENT GROUP KEYS

BACKGROUND

Enterprises often maintain a record of people, items, and/or entities of interest. For example, a commercial retail establishment may typically use databases of customers, vendors, and/or employees. A nonprofit organization may utilize a database of donors and potential donors. Sales offices may maintain a list of potential customers. Retail establishments may maintain a database of products offered for sale. Many other scenarios are conceivable where a database of people, items, and/or entities could be useful and desirable.

Often, it is desirable to link records in a database together in a group. A typical technique of linking records in a group is to assign a unique group key to every record that is associated with a particular group, such that records belonging to the same group have the same group key, and records that are not in the same group have different group keys. It may be desirable for group keys to remain consistent over multiple runs of a record linkage process.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
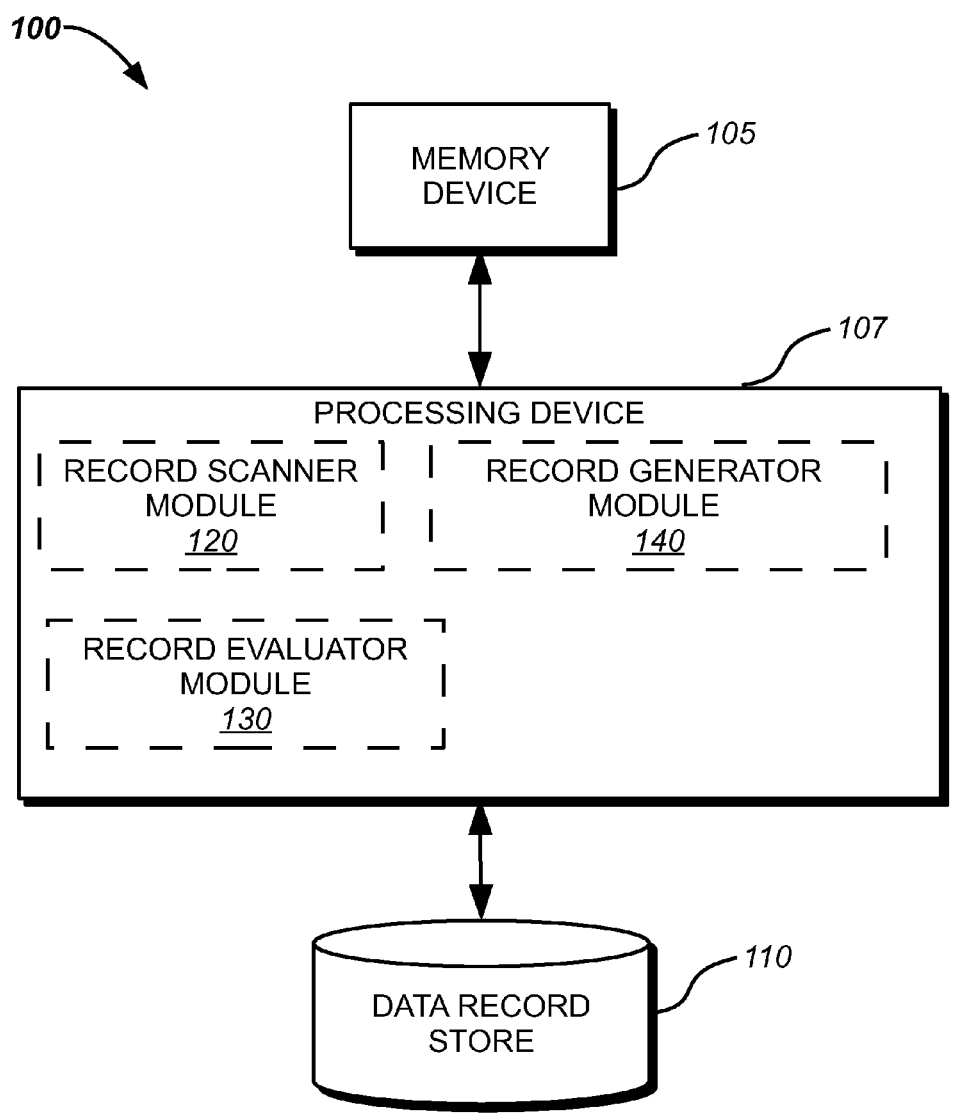
FIG. 1 is a block diagram illustrating components of a group key assignment system according to an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for assigning group keys in a record database. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

Embodiments of the present disclosure are directed to assigning group keys to records in a way that maintains temporal consistency of the group keys. Embodiments of the present disclosure generate a temporally consistent group key by determining, of the persistent records belonging to that group, which record has the earliest timestamp, and by incorporating the unique identifier of that record into the group key.

Referring now to FIG. 1, an embodiment of group key assignment system 100 of the present disclosure comprises record database 110, record scanner module 120, record evaluator module 130, and record generator module 140. In embodiments, record scanner module 120, record evaluator module 130, and/or record generator module 140 are implemented as computer-readable instructions and/or data stored in a memory 105 to direct a computer processor 107 to carry out operations as described herein.

In an embodiment, record database 110 comprises a data store of numerous records. A record may contain data regarding a particular person, entity, product, a combination thereof, or any other types of items that a database manager may desire to record. In embodiments, a record in a database 110 comprises a data field. Multiple records in a database 110 may pertain to a person, entity, or other item. Such records may be referred to herein as a group of records. A group of records may comprise aggregated information within database 110 about a particular person, entity or other item. For example, one record may store a person's name, another record may hold the person's address, and other records may each store the person's telephone number, e-mail address, and the like.

In an embodiment, records in a group are assigned a unique group key that is common to all member records in the group. In an embodiment, each record in database 110 is assigned a unique identifier, such as a universally unique identifier ("UUID"). In the present disclosure, a unique identifier of a record may be referred to as a record ID. In embodiments, a record ID is immutably assigned to a record, and is not recycled even if its corresponding record is removed from the database. In other words, a record ID will not be assigned to a different record after it has once been assigned to a record. In embodiments, each record in database 110 carries a timestamp reflecting when it was added to database 110.

According to embodiments of the present disclosure, database 110 holds two general types of records: persistent and temporary. In an embodiment, persistent records will never be removed from the database 110. Persistent records will also never be changed after insertion of the record into database 110. In embodiments, temporary records may be removed at any time from the database 110.

In an embodiment, the group key for any particular group comprises the record ID of the oldest persistent record that is a member of the group. If a group has no persistent records, then its group key comprises the record ID of the oldest temporary record that is a member of the group.

In an embodiment, record scanner module 120 is implemented in one or more computer processors and an operational memory that includes data and/or computer-readable instructions to direct the computer processor to search for one or more particular records in record database 110 and retrieve selected parameters of the record. In one embodiment, record scanner module 120 is programmed to identify all records storing a particular group key and therefore belonging to a specific group.

In an embodiment, record evaluator module 130 is implemented in one or more computer processors and an operational memory that includes data and/or computer-readable instructions to direct the computer processor to process parameters from two or more records and determine which record ID should constitute the group key for the records that were processed. In embodiments, record evaluator module 130 can identify which, if any, of the records under evaluation are persistent records. Record evaluator module 130 can also compare timestamps of each record to determine the oldest record under evaluation. In an embodiment, record evaluator module 130 can also compare lexicographical ordering of each record ID, which function may be utilized if two or more records have identical timestamps.

In an embodiment, record generator module 140 is implemented in one or more computer processors and an operational memory that includes data and/or computer-readable instructions to direct the computer processor to generate new records and save the new records to database 110. Record generator module 140 can receive a group key from record evaluator module 130 and insert that group key into each new record that belongs to the appropriate group. In an embodiment, record generator module 140 can receive data regarding an item and insert the data into fields of a new record.

Figure 2:
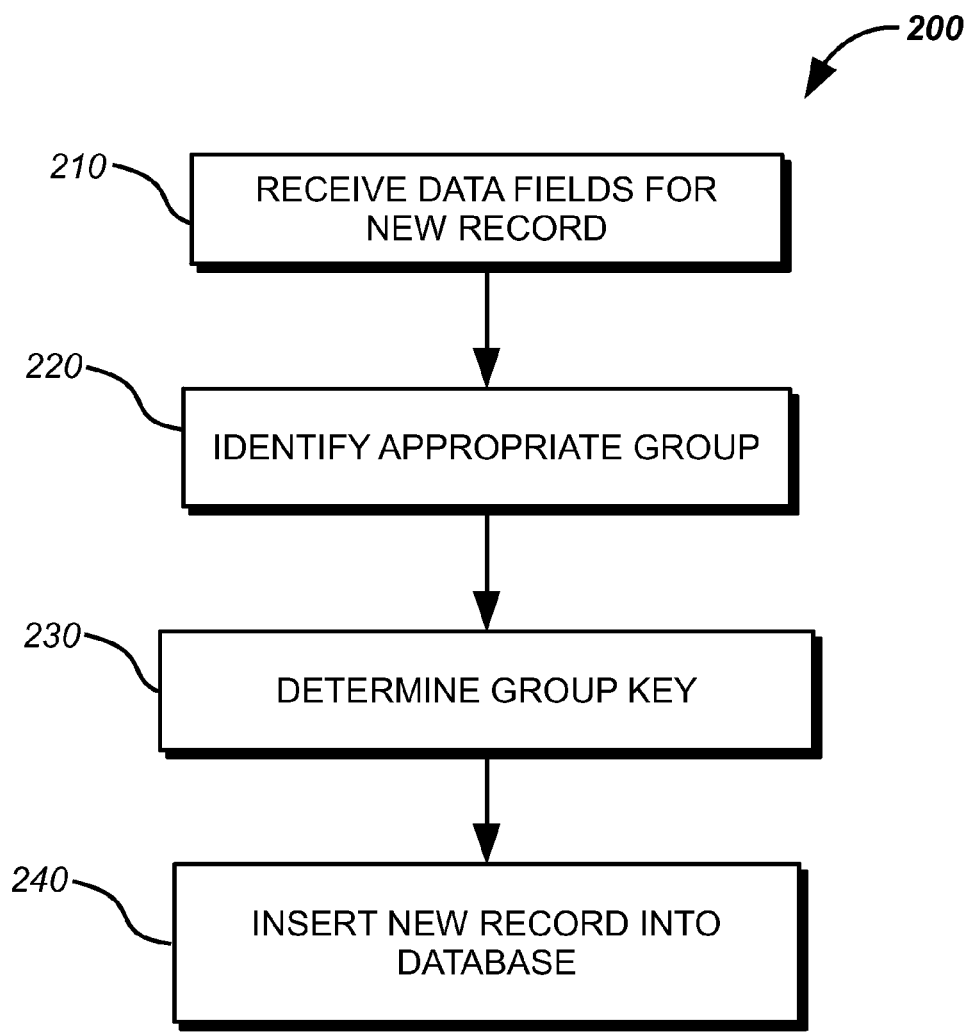
FIG. 2 is a chart illustrating an example method for adding a new record to a group in accordance with embodiments of the present disclosure.

In operation, group key assignment system 100 maintains temporally consistent group keys for record groups in a database. Referring now to FIG. 2, embodiments of the present disclosure comprise a method 200 for adding a new record to a group. At operation 210, record generator module 140 receives information to populate one or more data fields of a new record that is to be created.

At operation 220, the appropriate group into which the new record belongs is identified. In an embodiment, record generator module 140 receives an input that indicates the group to which the new record belongs, for example an entity name. Record scanner module 120 can scan database 110 for records with the provided entity name to identify the group to which the new record belongs.

At operation 230, record scanner module 120 determines the appropriate group key for the new record. In embodiments, the group key is uniform across all records in that group, so record scanner module 120 can determine the group key by retrieving the group key from the record identified in operation 220. In another embodiment, record scanner module 120 can retrieve the timestamps and record IDs from all persistent records belonging to the group. The retrieved timestamps and record IDs can be input to record evaluator module 130 for comparison to determine the oldest record. The record evaluator module 130 can return the record ID for the oldest persistent record, which may then be used as the group key. If two or more persistent records under comparison have identical timestamps, record evaluator module 130 may then compare lexicographical ordering of each record ID. The first-ordered persistent record ID may then be used as the group key.

At operation 240, record generator module 140 inserts the new record into database 110. In an embodiment, a unique record ID is generated and assigned to the new record. A timestamp is also generated for the current time and added to the new record. The new record is assigned the group key that was determined in operation 230.

Figure 3:
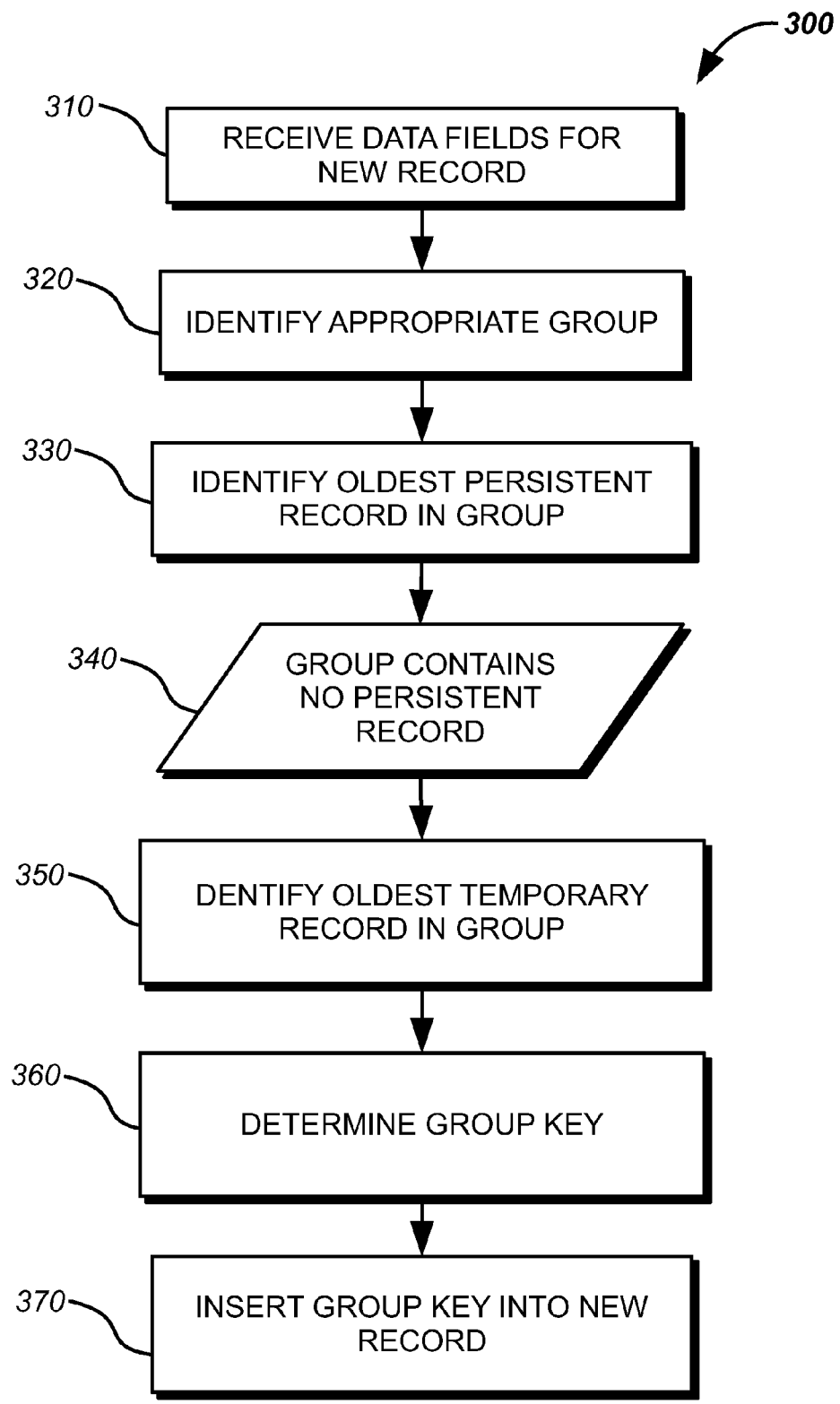
FIG. 3 is a chart illustrating an example method for adding a new record to a group if the group contains only temporary records in accordance with embodiments of the present disclosure.

Referring now to FIG. 3, embodiments of the present disclosure comprise a method 300 for adding a new record to a group if the group contains only temporary records. At operation 310, record generator module 140 receives information to populate one or more data fields of a new record that is to be created.

At operation 320, the appropriate group into which the new record belongs is identified. In an embodiment, record generator module 140 receives an input that indicates the group to which the new record belongs, for example an entity name. Record scanner module 120 can scan database 110 for records with the provided entity name to identify the group to which the new record belongs.

At operation 330, record scanner module 120 searches database 110 for all records belonging to the group identified in operation 320. Record scanner module 120 can attempt to retrieve the timestamps and record IDs from all persistent records belonging to the group. At operation 340, record scanner module 120 determines that the group contains no persistent records.

At operation 350, record scanner module 120 retrieves the timestamps and record IDs from all temporary records belonging to the group. The retrieved timestamps and record IDs can be input to record evaluator module 130 for comparison to determine the oldest record. The record evaluator module 130 can return the record ID for the oldest temporary record.

At operation 360, record scanner module 120 determines the appropriate group key for the new record. In embodiments, the group key is the record ID from the oldest temporary record identified in operation 350. If two or more temporary records under comparison have identical timestamps, record evaluator module 130 may then compare lexicographical ordering of each record ID. The first-ordered record ID may then be used as the group key. In one embodiment, if the new record is a persistent record, then its record ID will become the new group key because that record will be the oldest persistent record in the group. Accordingly, the record ID that will be generated in operation 370 is determined to be the group key.

At operation 370, record generator module 140 inserts the new record into database 110. In an embodiment, a unique record ID is generated and assigned to the new record. A timestamp is also generated for the current time and added to the new record. The new record is assigned the group key that was determined in operation 360. If the group key has been determined to be the record ID of the new record, then record generator module 140 creates a new temporary record for each record that was previously in the group, assigns the new group key to each temporary record, and removes the temporary records that contained the old group key.

Figure 4:
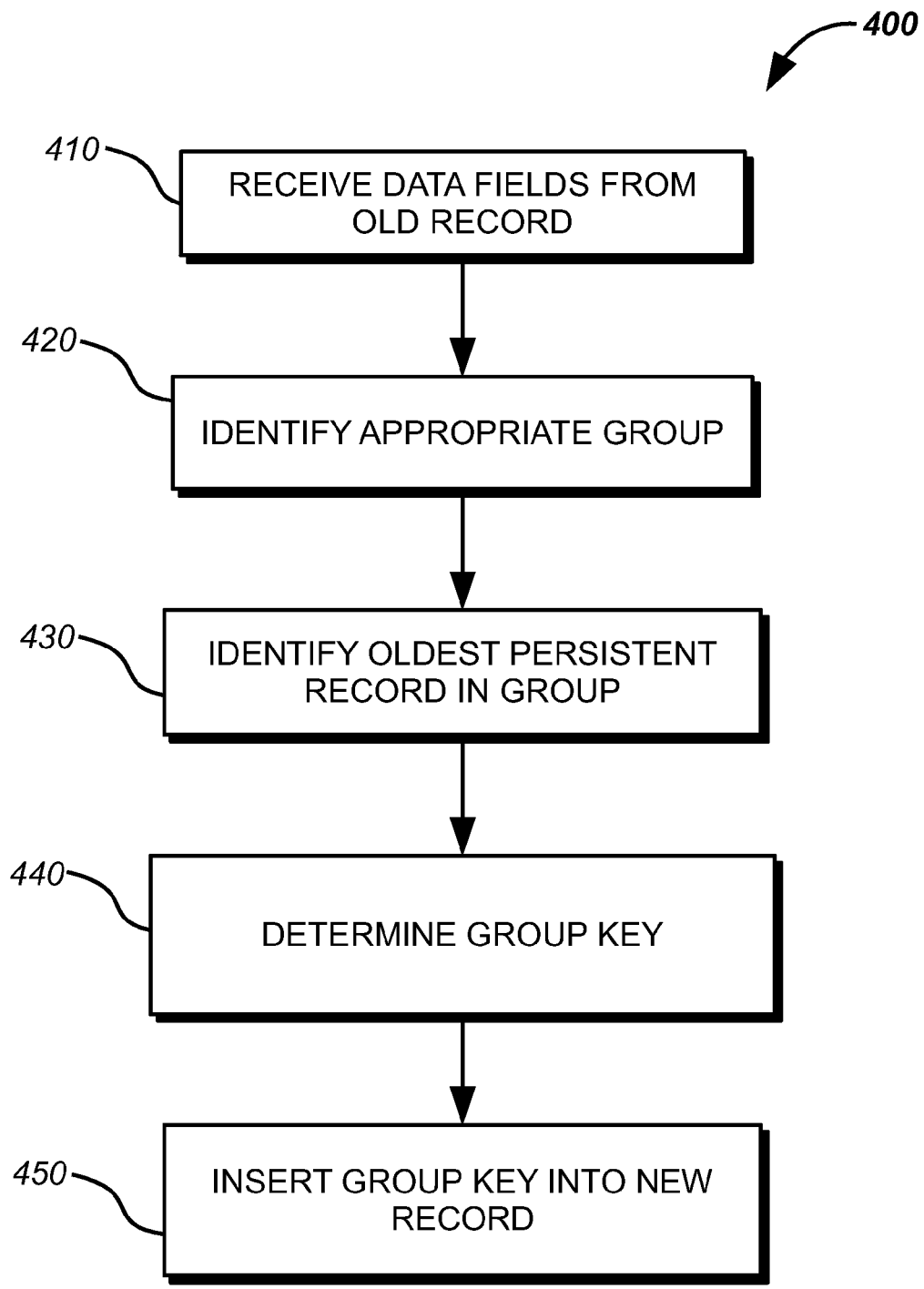
FIG. 4 is a chart illustrating an example method for updating a record in accordance with embodiments of the present disclosure.

Referring now to FIG. 4, embodiments of the present disclosure comprise a method 400 for updating a record. In embodiments, a record data field in a record pertaining to an entity may become outdated or otherwise no longer accurate. For example, a record can store an address for an entity. All records pertaining to that entity may store data about the entity, such as the entity name, contact information, or any other data of interest regarding the entity. In one example, an entity stored in a group of record obtains a new address. In method 400, a new record is generated that contains the new address and is assigned the group key.

At operation 410, record generator module 140 receives the new data to populate one or more data fields of a new record that is to be created. At operation 420, the appropriate group into which the new record belongs is identified. In an embodiment, record generator module 140 receives an input that indicates the group to which the new record belongs, for example an entity name. Record scanner module 120 can scan database 110 for records with the provided entity name to identify the group to which the new record belongs.

At operation 430, record scanner module 120 searches database 110 for all records belonging to the group identified in operation 420. Record scanner module 120 retrieves the timestamps and record IDs from all persistent records belonging to the group.

At operation 440, record scanner module 120 determines the appropriate group key for the new record. In embodiments, the group key is uniform across all records in that group, so record scanner module 120 can determine the group key by retrieving the group key from a record identified in operation 420. In another embodiment, record scanner module 120 can retrieve the timestamps and record IDs from all persistent records belonging to the group. The retrieved timestamps and record IDs can be input to record evaluator module 130 for comparison to determine the oldest record. The record evaluator module 130 can return the record ID for the oldest persistent record, which may then be used as the group key. If two or more persistent records under comparison have identical timestamps, record evaluator module 130 may then compare lexicographical ordering of each record ID. The first-ordered persistent record ID may then be used as the group key.

At operation 450, record generator module 140 inserts the new record into database 110. In an embodiment, a unique record ID is generated and assigned to the new record. A timestamp is also generated for the current time and added to the new record. The new record is assigned the group key that was determined in operation 440.

According to embodiments of the present disclosure, two groups may be merged together (either because of a bridge record or a change in a record linkage algorithm) by assigning the group key of one of the merged groups to all records in the group. The group key to be assigned may be selected by determining which record has the oldest timestamp and using the record ID of the oldest persistent record as the new group key.

According to embodiments of the present disclosure, a group may be split into two or more smaller groups (either because of the removal of a temporary bridge record or an algorithm change) by assigning one of the resulting groups a new group key and, for the other resulting group, retaining the original group key as the group key. The resulting group having the oldest persistent record can retain the original group key and the other resulting group may be assigned a group key based on the record ID of the oldest persistent record in that group.

As one of ordinary skill in the art having the benefit of the present disclosure may recognize, embodiments disclosed herein may present several advantages. For example, groups having at least one persistent record may have a temporally consistent group key, because subsequent addition of new records to such a group may not affect its group key because those later-added records have later timestamps. As another example, embodiments of the present disclosure may be implemented in a decentralized fashion.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A computer-implemented method for adding a new record to a database comprising a plurality of records, each record comprising a record ID and being a member of a group, the method comprising:
    at a computer processor of a record generator module, receiving data pertaining to the new record, the data comprising at least one parameter indicative of membership in a group;
    at a computer processor of a record scanner module, identifying a group based on the at least one parameter;
    at the computer processor of the record scanner module, identifying all records in the group based on the at least one parameter;
    at a computer processor of a record evaluator module, retrieving an oldest record of the identified records in the group;
    at the computer processor of the record generator module, setting a group key to be the record ID of the oldest record; and
    at the computer processor of the record generator module, inserting the group key into the new record and then inserting the new record into the database.

2. The method of claim 1, further comprising:
    generating a unique record ID for the new record; and
    inserting the unique record ID for the new record into the new record.

3. The method of claim 2, wherein the unique record ID comprises a universally unique identifier.

4. The method of claim 1, wherein each of the identified records in the group is a temporary record or a persistent record, and wherein retrieving the oldest record of the identified records in the group further comprises retrieving the oldest persistent record of the identified records in the group.

5. The method of claim 1, wherein each of the identified records in the group is a temporary record or a persistent record, and wherein retrieving the oldest record of the identified records in the group further comprises:
    determining that the group contains no persistent records; and
    retrieving the oldest temporary record of the identified records in the group.

6. The method of claim 5, further comprising:
    inserting the record ID of the oldest record into all records in the group.

7. The method of claim 1, wherein retrieving the oldest record of the identified records in the group further comprises:
    comparing a timestamp of each one of the identified records in the group; and
    identifying the oldest timestamp.

8. The method of claim 7, further comprising:
    identifying two or more of the identified records in the group that have the oldest timestamp; and
    comparing a lexicographical order of a record ID of each one of the identified records in the group that have the oldest timestamp.

9. The method of claim 1, further comprising:
    at the computer processor of the record generator module, generating a timestamp; and
    at the computer processor of the record generator module, inserting the timestamp into the new record.

10. A system for adding a new record to a database comprising a plurality of records, each record being a member of a group, the system comprising:
    one or more record scanner processors and one or more record scanner processing memory devices operably coupled to the one or more record scanner processors and storing executable and operational record scanner data, the executable and operational record scanner data effective to cause the one or more record scanner processors to search for one or more previous records in the data record store and retrieve a selected parameter of one of the previous records, each one of the previous records comprising a unique record ID and a timestamp;
    one or more record evaluator processors and one or more record evaluator processing memory devices operably coupled to the one or more record evaluator processors and storing executable and operational record evaluator data, the executable and operational record evaluator data effective to cause the one or more record evaluator processors to:
    process a selected parameter of the one or more previous records to identify a group of previous records that the new record is a member of and
    select the unique record ID of one of the previous records in the group to be a group key; and
    one or more record generator processors and one or more record generator processing memory devices operably coupled to the one or more record generator processors and storing executable and operational record generator data, the executable and operational record generator data effective to cause the one or more record generator processors to generate the new record and then insert the new record into the database.

11. The system of claim 10, wherein the executable and operational record evaluator data is effective to cause the one or more record evaluator processors to determine if any of the one or more previous records are persistent records.

12. The system of claim 10, wherein the executable and operational record evaluator data is effective to cause the one or more record evaluator processors to compare timestamps of the one or more previous records to determine the oldest record.

13. The system of claim 10, wherein the executable and operational record evaluator data is effective to cause the one or more record evaluator processors to compare lexicographical ordering of each record ID.

14. A computer-implemented method for updating an updated record in a database comprising a plurality of records, each record comprising a record ID and being a member of a group, the method comprising:
    at a computer processor of a record generator module, receiving data pertaining to the updated record, the data comprising at least one parameter indicative of membership in a group;
    at a computer processor of a record scanner module, identifying a group of the updated record based on the at least one parameter;

at a computer processor of a record evaluator module, retrieving an oldest record in the group;

at the computer processor of the record generator module, setting a group key to be the record ID of the oldest record; and at the computer processor of the record generator module, inserting the group key into the updated record and then inserting the updated record into the data record store.

15. The method of claim 14, further comprising:
generating a unique record ID for the updated record; and
inserting the unique record ID for the updated record into the updated record.

16. The method of claim 15, wherein the unique record ID comprises a universally unique identifier.

17. The method of claim 14, wherein each of the identified records in the group is a temporary record or a persistent record, and wherein retrieving the oldest record in the group further comprises retrieving the oldest persistent record in the group.

18. The method of claim 14, wherein each of the identified records in the group is a temporary record or a persistent record, and wherein retrieving the oldest record in the group further comprises:
determining that the group contains no persistent records; and
retrieving the oldest temporary record of the identified records in the group.

19. The method of claim 14, wherein retrieving the oldest record in the group further comprises:
comparing a timestamp of records in the group; and
identifying the oldest timestamp.

20. The method of claim 14, further comprising:
at the computer processor of the record generator module, generating a timestamp; and
at the computer processor of the record generator module, inserting the timestamp into the new record.

* * * * *